United States Patent
Abebe et al.

(10) Patent No.: US 10,573,199 B2
(45) Date of Patent: Feb. 25, 2020

(54) REFRESHABLE BRAILLE DISPLAY DEVICE

(71) Applicant: International Business Machines Corporation, Armonk, NY (US)

(72) Inventors: Ermyas Abebe, Carlton (AU); Alessio Bonti, Carlton (AU); Adam Eberbach, Surrey Hills (AU); Peter Ilfrich, Kensington (AU); Nicholas I. Waywood, Heidelberg Heights (AU)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 15/440,600

(22) Filed: Feb. 23, 2017

(65) Prior Publication Data

US 2018/0240362 A1   Aug. 23, 2018

(51) Int. Cl.
| | | |
|---|---|---|
| *G09B 21/00* | (2006.01) | |
| *G09B 21/02* | (2006.01) | |
| *G06F 3/02* | (2006.01) | |
| *B41J 3/32* | (2006.01) | |

(52) U.S. Cl.
CPC .............. *G09B 21/004* (2013.01); *B41J 3/32* (2013.01); *G06F 3/02* (2013.01); *G06F 3/0202* (2013.01); *G09B 21/001* (2013.01); *G09B 21/002* (2013.01); *G09B 21/005* (2013.01); *G09B 21/02* (2013.01)

(58) Field of Classification Search
None
See application file for complete search history.

(56) References Cited

U.S. PATENT DOCUMENTS

| | | | | |
|---|---|---|---|---|
| 6,675,028 | B1* | 1/2004 | Heie ................ | H04M 1/72594 434/113 |
| 6,776,619 | B1* | 8/2004 | Roberts ............... | G09B 21/001 340/4.12 |
| 7,744,372 | B1* | 6/2010 | Minnich ............... | G09B 21/02 434/113 |
| 9,183,759 | B2 | 11/2015 | Bourdon et al. | |
| 9,965,974 | B2 | 5/2018 | Labbe et al. | |
| 2003/0122689 | A1* | 7/2003 | Romeo ............... | G09B 21/005 341/21 |
| 2004/0145455 | A1* | 7/2004 | Gipson ............... | G09B 21/004 340/407.1 |
| 2014/0356819 | A1* | 12/2014 | Rodriguez Regalado ................... | A61F 9/08 434/114 |
| 2015/0243189 | A1* | 8/2015 | Jain ...................... | G09B 21/004 434/113 |
| 2017/0309203 | A1 | 10/2017 | Kim et al. | |

* cited by examiner

*Primary Examiner* — Jason T Yen
(74) *Attorney, Agent, or Firm* — Joseph Petrokaitis; Ryan, Mason & Lewis, LLP

(57) ABSTRACT

A refreshable Braille display device includes a housing having a surface containing a set of tactile markers thereon; a carriage in cooperation with the housing, the carriage having a surface containing a tactile marker thereon and a series of individual refreshable Braille cells positioned above the tactile marker for tactile reading by a user; and a moving mechanism for moving the carriage relative to the housing such that the tactile marker on the surface of the carriage is aligned with one of the tactile markers in the set of tactile markers on the surface of the housing.

20 Claims, 7 Drawing Sheets

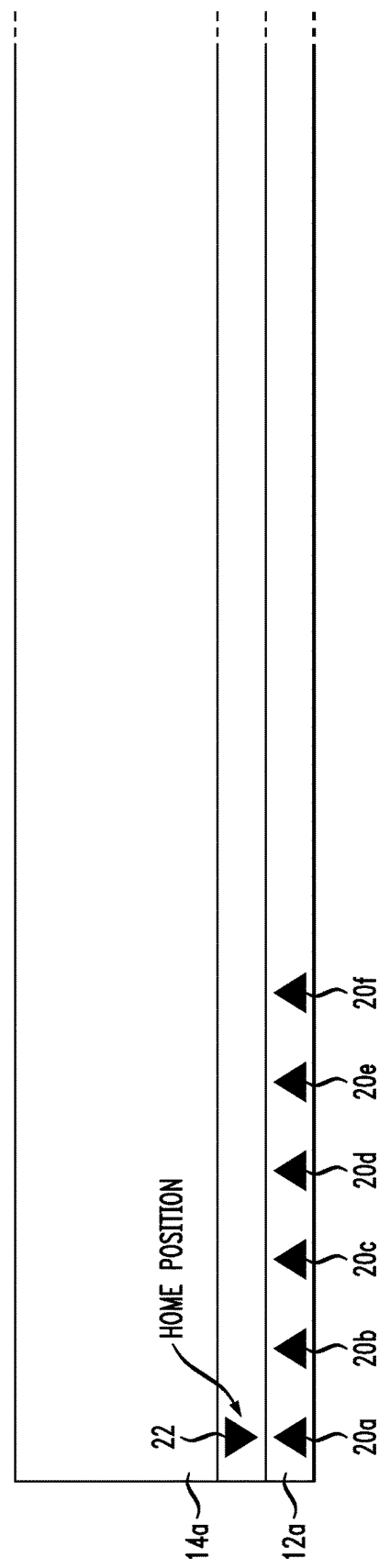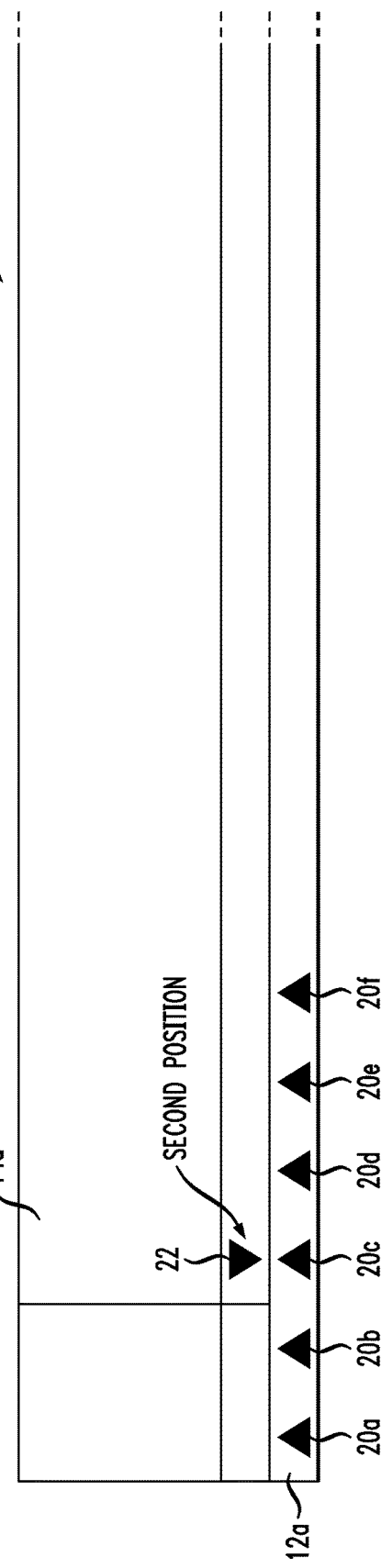

REFRESHABLE BRAILLE DISPLAY DEVICE

BACKGROUND

The Braille code is widely used by visually impaired people to read and write. The Braille code is written in Braille cells, wherein each Braille cell is made up of six or eight dot positions which are arranged in a rectangle comprising two columns of three or four dots each. Each Braille cell represents a character, a sign or a number according to the commonly known Braille code. Today, different Braille codes or code pages are used to map character sets of different language to the Braille cells. Further, there are different Braille codes which are used for different purposes like mathematics or music. Reading Braille relies on the sense of touch, where reading is done by running a finger over a combination of characters.

SUMMARY

Embodiments provide refreshable Braille display devices.

For example, in one embodiment, a refreshable Braille display device is provided which includes a housing having a surface containing a set of tactile markers thereon. The refreshable Braille display device further includes a carriage in cooperation with the housing, the carriage having a surface containing a tactile marker thereon and a series of individual refreshable Braille cells positioned above the tactile marker for tactile reading by a user. The refreshable Braille display device further includes a moving mechanism for moving the carriage relative to the housing such that the tactile marker on the surface of the carriage is aligned with one of the tactile markers in the set of tactile markers on the surface of the housing.

In another embodiment, method is provided with includes operating a refreshable Braille display device including a housing having a surface containing a set of first tactile markers thereon; a carriage disposed in the housing, the carriage having a surface containing a second tactile marker thereon and a series of individual refreshable Braille cells positioned above the tactile marker for tactile reading by a user; and a moving mechanism for moving the carriage relative to the housing such that the tactile marker on the surface of the carriage is aligned with one of the tactile markers in the set of tactile markers on the surface of the housing. The operating step of the method is implemented via at least one processor operatively coupled to the refreshable Braille display device.

In another embodiment, a computer program product is provided which includes a processor-readable storage medium having encoded therein executable code of one or more software programs. The one or more software programs when executed by the one or more processors implement step of sending a signal from the processor to a refreshable Braille display device. The refreshable Braille display device includes a housing having a surface containing a set of first tactile markers thereon; a carriage disposed in the housing, the carriage having a surface containing a second tactile marker thereon and a series of individual refreshable Braille cells positioned above the tactile marker for tactile reading by a user; and a moving mechanism for moving the carriage relative to the housing such that the tactile marker on the surface of the carriage is aligned with one of the tactile markers in the set of tactile markers on the surface of the housing. The signal represents an instruction to the moving mechanism associated with positioning the tactile marker on the surface of the carriage with one of the tactile markers in the set of tactile markers on the surface of the housing.

BRIEF DESCRIPTION OF THE DRAWINGS

FIG. 2A is a schematic top plan view of a refreshable Braille display device according to FIG. 1 in which the tactile markers are in the home position.

FIG. 2B is a schematic top plan view of a refreshable Braille display device according to FIG. 1 in which the tactile markers are in the second tab position.

DETAILED DESCRIPTION

Figure 1:
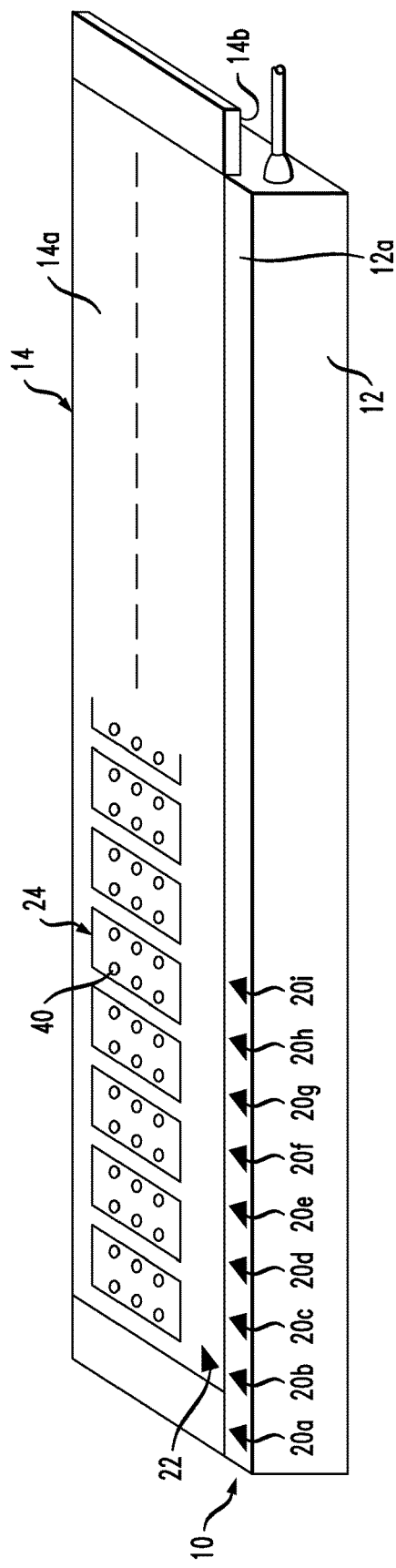
FIG. 1 is a schematic perspective view of a refreshable Braille display device according to an embodiment of the present invention.

Embodiments will now be described in further detail with regard to refreshable Braille display devices. It is to be understood that the various components and/or regions shown in the accompanying drawings are schematic illustrations that are not necessarily drawn to scale. In addition, for ease of explanation, one or more components of a type commonly used to form refreshable Braille display devices may not be explicitly shown in a given drawing. This does not imply that any component and regions not explicitly shown are omitted from the actual refreshable Braille display devices.

Furthermore, it is to be understood that the embodiments discussed herein are not limited to the particular materials, features, and components shown and described herein. In particular, with respect to components of the refreshable Braille display devices, it is to be emphasized that the descriptions provided herein are not intended to encompass all of the components that may be used to form a refreshable Braille display device. Rather, certain components that are commonly used in forming refreshable Braille display devices are purposefully not described herein for economy of description.

Moreover, the same or similar reference numbers are used throughout the drawings to denote the same or similar features, elements, or components, and thus, a detailed explanation of the same or similar features, elements, or components will not be repeated for each of the drawings. It is to be understood that the terms "about" or "substantially" as used herein with regard to thicknesses, widths, percentages, ranges, etc., are meant to denote being close or approximate to, but not exactly. For example, the term "about" or "substantially" as used herein implies that a small margin of error is present such as, by way of example only, 1% or less than the stated amount.

As illustratively used herein, the term "connected", "coupled" and any variants thereof means any connection or coupling, either direct or indirect, between two or more elements. The connection or coupling between the elements may be physical, logical, electrical or a combination thereof. Additionally, data communication between connected or coupled elements may be wired, wireless or a combination thereof.

As illustratively used herein, the term "refreshable Braille display" refers to a component of the Braille device that is capable of presenting Braille data (e.g., Braille characters such as letters, numbers, punctuations, symbols, indicators, Braille composition signs, and the like) to a user. In particular, the term "refreshable" is intended to mean that the Braille display is capable of refreshing or changing over time, either automatically or controllably, the Braille data that is displayed to the user.

A beneficial tool for visually impaired people using a computer is a Refreshable Braille Display (RBD). In general, RBDs are electromechanical devices that allow visually impaired readers to review work or read material, which an enabled reader can do on a computer screen. Usually, dots are raised through holes in a flat touch-and-sense surface and visually-impaired people may recognize the displayed Braille characters by touching and sensing the Braille line. Typically, RBDs range in terms of the number of characters presented on one line, but most standard displays can present in the range of from about 40 to about 80 cell characters.

Unfortunately, many visually impaired citizens around the country are forced to use the traditional audio device method to review work or read material due to the scarce supply and high cost of RBD's. The RBD may be used to read text tactually that is displayed visually on a computer monitor. The RBD may be connected to a personal computer via a serial or USB cable and produces a Braille output by help of a plurality of small plastic or metal pins that move up and down to display the Braille characters in the Braille cells of the touch-and-sense surface in the Braille line.

However, Braille display systems are limited in that, RBDs offer limited display space and consuming any of the output area with leading spaces is extremely limiting. Accordingly, there is a need for an improved refreshable Braille display device which does not consume any of the output area for leading spaces (i.e., indents) thereby providing a greater display space for the user.

The refreshable Braille display device of the present invention advantageously allows for the full width of the display to be available for conveying information to the user. In this regard, the indent of a line of text in the series of Braille cells may be determined at any time by way of a set of tactile markers on an immobile base. Movement of the carriage between the lines of text having different indent levels thereby signals to a user that the indent level has changed for a new line of text in the series of Braille cells.

Figure 3:
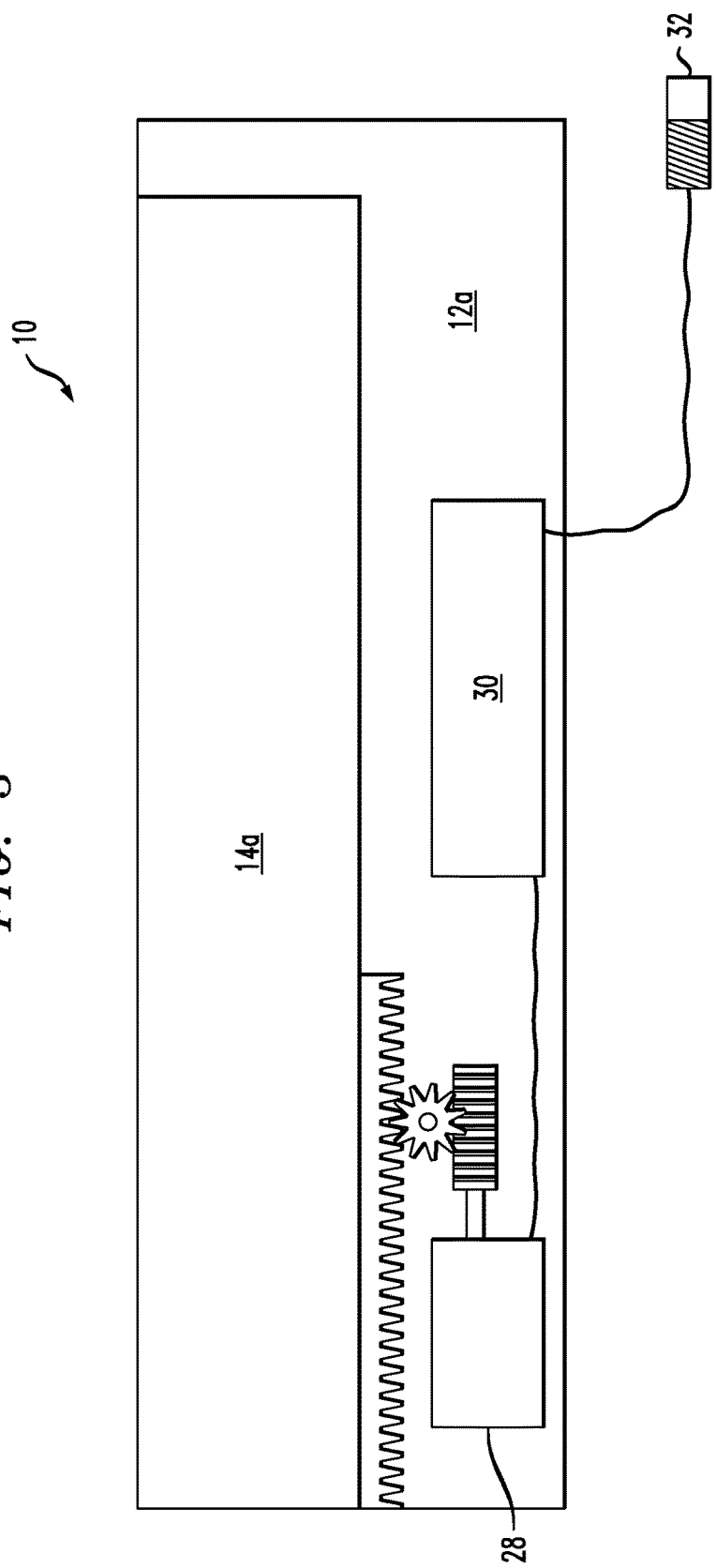
FIG. 3 is a schematic perspective view of a refreshable Braille display device according to an embodiment of the present invention.

The refreshable Braille display device will now be discussed in further detail. Referring to FIGS. 1 to 3, the refreshable Braille display device 10 includes a housing 12 having a surface 12a. The housing 12 generally defines the overall shape of the refreshable Braille display device 10 and houses, holds, supports and/or protects its various components. The housing 12 can consist of a thin rectangular shell made of light yet sturdy and durable material such as, for example, a molded plastic shell or lightweight metal alloys such as aluminum-magnesium alloys.

In the illustrated embodiment, the housing 12 is shaped as a rectangular prism of width w, height h and thickness t. It will be appreciated that the housing 12 may have an ergonomic shape and be lightweight to facilitate grasping and holding of the refreshable Braille display device 10. For example, in some embodiments, the refreshable Braille display device 10 may be provided with rounded corners to facilitate holding and handling by a user. The width w, height h and thickness t may each be selected based on the particularities or requirements of a given application. For example, in the illustrated embodiment, w can be from about 200 mm to about 500 mm, h can be from about 15 mm to about 80 mm and t can be from about 40 mm to about 200. Of course, these dimensions are given for illustrative purposes only and may differ in other embodiments. It will also be understood that the housing 12 may assume a variety of shapes other than rectangular such as, for example, circular, semi-circular, square, elliptical, oval, parallelepipedal or trapezoidal.

As illustrated in FIG. 1, the width w of the housing 12 generally sets the maximum value permissible for the width of carriage 14 and the refreshable Braille display 16. Accordingly, in some embodiments, the width w of the housing 12 can be selected based on a desired, intended or required width for the carriage 14 and/or the refreshable Braille display 16. In other words, in some embodiment, the width w of the housing 12 may be substantially equal to the width of the carriage 14 and/or to the width of the refreshable Braille display 16. It will also be understood that the width-to-thickness (w/t) and height-to-thickness (h/t) ratios of the housing 12 can each be made relatively large, so as to ensure that the refreshable Braille display device 10 has large enough carriage 14 and refreshable Braille display 16 while remaining sufficiently thin for ease of holding by a user.

Surface 12a of housing 12 will include a set of tactile markers 20. The number of tactile markers included in the set will necessarily depend on the number of Braille cells in carriage 14 as discussed below. In general, the number of tactile markers in the set can range from about 10 to about 80 or from about 60 to about 80 markers. As shown in FIGS. 1-3, the set of tactile markers 20 includes tactile markers 20a-20i. In one embodiment, markers 20a-20i are generally in parallel to each other. In addition, markers 20a-20i can be in the shape of, for example, dots, lines, circles, crosses, squares, or other geometrical shapes and patterns, or any asymmetrical shape or pattern. Markers 20a-20i can be made of soft, elastic, plastic, or flexible material. In one embodiment, markers 20a-20i can be made of rigid, solid, or coarse material. In one embodiment, markers 20a-20i go inward or lower or down (as a hole, recess, or niche), with respect to the surface 12a of housing 12. In one embodiment, markers 20a-20i go outward or higher or up, with respect to surface 12a of housing 12.

Carriage 14 is disposed in housing 12 and has a surface 14a containing a tactile marker 22 thereon and a series of individual refreshable Braille cells 24. As one skilled in the art will readily appreciate, carriage 14 is generally of a similar shape as housing 12 so that it can be disposed therein. In addition, carriage 14 is likewise made of a similar or same material as housing 12. As with markers 20a-20i, marker 22 can be in the shape of, for example, dots, lines, circles, crosses, squares, or other geometrical shapes and patterns, or any asymmetrical shape or pattern. In one embodiment, marker 22 can be made of soft, elastic, plastic, or flexible material. Alternatively, marker 22 can be made of rigid, solid, or coarse material. In one embodiment, marker 22 can go inward or lower or down (as a hole, recess, or niche), with respect to the surface 14a of carriage 14. In one embodiment, marker 22 can go outward or higher or up, with respect to surface 12a of housing 12.

Carriage 14 is movable relative to housing 12 via a moving mechanism such that tactile marker 22 on surface 14a of carriage 14 is aligned with one of tactile markers 20a-20i in the set of tactile markers on surface 12a of housing 12. For example, as shown in FIG. 2A, when marker 22 is aligned with marker 20a, the markers are in the home position, i.e., zero (0) tab position, as discussed below. Then, as shown in FIG. 2B, when tactile marker 22 is aligned with tactile marker 20c, the tactile markers are in the second tab position.

Refreshable Braille cells 24 are aligned across the front of surface 14a of carriage 14. The refreshable Braille display device supports an array of individual Braille cells with corresponding tactile pins. In general, the refreshable Braille display comprises a linear array of one or more rows of adjacent Braille cells 24. Each Braille cell 24 may, but need not, include a plurality of electromechanically actuated or controlled pins 40, where each pin 40 is selectively raisable and lowerable to enable tactile Braille reading by the user. In the illustrated embodiment, each Braille cell 38 has six pins 40 arranged in two columns of three pins. However, other configurations are possible such as, for example, eight pins arranged in two columns of four pins. As known in the art, the electromechanically actuated pins 40 of each Braille cell 24 can be moved up and down in response to an electrical signal originating from a processing unit to form different combinations of raised pins representing Braille characters such as, for example, letters, numbers, punctuations, symbols, indicators, Braille composition signs, and the like.

It will be understood that in embodiments where the refreshable Braille display is provided with Braille cells, the Braille cells need not involve or be based on an electromechanical actuation, but could be activated using any other suitable actuation technology (e.g., magnetic or infrared laser radiation) without departing from the scope of the invention. Additionally, it will be understood that the refreshable Braille display need not be embodied by Braille cells, but could be embodied by any suitable element (e.g., a tactile image screen) capable of presenting, displaying or otherwise outputting Braille content to a user in a refreshable manner.

In some embodiments, the refreshable Braille display device 10 can include a linear array of one or more rows of adjacent Braille cells 24. The number of Braille cells in the refreshable Braille display device can vary according to each device. In one embodiment, the refreshable Braille display device can include an array of up to 80 Braille cells, e.g., from about 10 to about 80 Braille cells or from about 60 to about 80 Braille cells. In some embodiments, the refreshable Braille display device may include fourteen, sixteen, eighteen, twenty or more Braille cells. Likewise, in some embodiments, the refreshable Braille display device may include more than one row of Braille cells.

Figure 4:
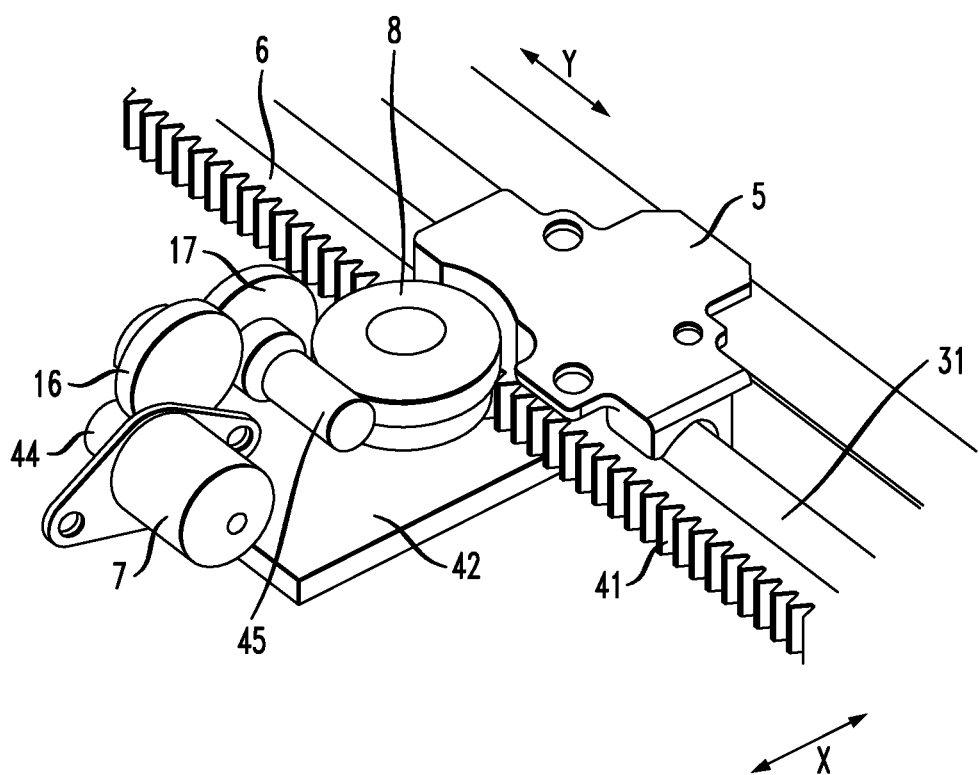
FIG. 4 is a perspective view illustrating a drive mechanism for a carriage according to one embodiment where the carriage is omitted.

Moving mechanism for moving carriage 14 relative to housing 12, can be any suitable moving mechanism known in the art. In one embodiment, a moving mechanism can be a gear mechanism coupled to an electric motor such as a stepper motor or servo motor. For example, in one embodiment, a gear mechanism includes a worm gear. However, other gear mechanism are contemplated such as a bevel gear, a pneumatic actuator, a series of linked solenoids, or a shape-memory alloy. In one illustrative embodiment, FIG. 4 is a perspective view illustrating a moving mechanism for the carriage 14 according to an embodiment, in which the carriage 14 is omitted. The moving mechanism for carriage 14 including housing 12 will be described. The rack member 6 fixed on the apparatus body 1 has rack teeth 41 formed approximately over the whole length thereof. The slider 5 and a supporting frame 42 are fixed on a lower surface 14b (see FIG. 1) of carriage 14, and the motor 7, e.g., a stepper motor, serving as a driving source is attached on the supporting frame 42. The supporting frame 42 supports the pinion gear 8 rotatably meshed with the rack teeth 41. The rotation of the motor 7 is transmitted from a motor gear 44 to a worm gear 17 via an idler gear 16, and further transmitted to the pinion gear 8 via a worm wheel 45 formed integrally with the worm gear 17.

The pinion gear 8 rotates meshing with the rack teeth 41 of the rack member 6. A propulsive force, generated by the rotation force of the pinion gear 8, acts on the rack member 6, and thereby the carriage 14 moves with the propulsive force. The movement of the carriage 14 is guided in the arrow Y direction, illustrated in FIG. 4, by slide-engaging of the slider 5 and the guide rail 31, which is described below. That is, when the motor 7 is driven in response to a command, e.g., a central processing unit (CPU) (not shown), the worm gear 17 is rotated via the idler gear 16 to transmit the driving force to the worm wheel 45, and the pinion gear 8 is rotated. The rotation force is transformed into the propulsive force of the rack member 6 and the series of individual refreshable Braille cells 24 included in the carriage 14 can self-run back and forth along the housing 12 such that tactile marker 22 on surface 14a of carriage 14 is aligned with one of tactile markers 20a-20i in the set of tactile markers on surface 12a of housing 12.

Referring now to FIG. 3, refreshable Braille display device 10 can further include a processing unit 30 in the housing 12 for processing output to derive the current tab position of the tactile marker in the set of tactile markers. The processing unit 30 may be connected to the various components of the refreshable Braille display device such as moving mechanism 28 via, typically USB ports but also, for example, different input/output (I/O) communication ports 32, such as inter-integrated circuit (I2C) ports, Bluetooth™ ports, serial peripheral interface (SPI) ports and display ports.

As illustratively used herein, the term "processing unit" refers to an entity of the refreshable Braille display device that controls or executes, at least partially, the functions required for operating the refreshable Braille display device. These functions can include, without being limited to, deriving the current tab position of the line displayed on the attached refreshable Braille display or inputting Braille data entered through the refreshable Braille display device implemented on a touch-sensitive surface and outputting Braille data displayed by the refreshable Braille display.

Referring now to FIGS. 2A and 2B, refreshable Braille display device 10 will start in the home position, i.e., zero (0) tab position, where tactile marker 20a is aligned with tactile marker 22 (see FIG. 2A). In operation, the moving mechanism will move the carriage 14 to align tactile marker 22 with one of tactile markers 20a-20f in the set of tactile markers to allow the user to know the indent of the line of text in the Braille cells. For example, as shown in FIG. 2B, carriage 14 is moved to align tactile marker 22 with tactile marker 20c in the set of tactile markers to allow the user to know that the line of text in the Braille cells is indented by two tab positions.

It will be understood that the processing unit may be embodied as a single unit or a plurality of interconnected processing sub-units, and be implemented in hardware, software, firmware or any combination thereof. For example, the processing unit of the refreshable Braille display device may be embodied by a microprocessor, a microcontroller, a central processing unit (CPU), a processing core, a system on a chip (SoC), a digital signal processor (DSP), a programmable logic device, or by any other processing resource or any combination of such processing resources configured to operate collectively as a processing unit.

Although the processing unit according to embodiments of the refreshable Braille display device can be described as a series of various modules, each associated with one or more different functions, it will be understood that, in practice, each module may include a plurality of sub-modules, routines, components, communication ports, software, and the like cooperating together in order to accomplish the corresponding function. It will also be understood that this subdivision into such modules is made from a conceptual standpoint only and that, in practice, a given hardware or software component may be shared by different modules. Likewise, components of different modules may be combined together physically and/or logically without departing from the scope of the present invention. The various physical components of the processing unit and the interconnections therebetween may be provided on an integrated circuit (IC) die, which can itself be mounted onto one or multiple printed circuit boards (PCBs).

The output Braille data displayed on the refreshable Braille display device may originate not only from input Braille data that was previously typed on a virtual Braille keyboard, but also, or alternatively, from Braille content originating from other sources. Exemplary other sources can include, without being limited to, the Internet, a peripheral device wired or wirelessly connected to the refreshable Braille display device or images acquired by a camera included in the refreshable Braille display device. In the last case, the processing unit may include a text-recognition module (e.g., based on optical character recognition) adapted to recognize and render in text form textual information on an image acquired by the camera. The processing unit may then convert the recognized textual information to Braille, which can be presented to a user on the refreshable Braille display device. The processing unit may also include a text-to-speech module to additionally or alternatively output the textual information as an audio output via the speaker device.

In some implementations, the processing unit may further include a Braille conversion module to convert Braille coded information (e.g., Grade 1 Braille and Grade 2 Braille) into sighted language coded information. In other implementations, the processing unit may also optionally include a wireless communication module, capable of communicating with external devices and systems using one or more of cellular, Wi-Fi and Bluetooth™ protocols or any other appropriate communication protocols.

The refreshable Braille display device can also be connectable to various other devices and peripherals including, without being limited to, a portable or desktop computer, a tablet computer, a smartphone, a cellular phone, a monitor, a printer, an embosser, a scanner, a camera, a keyboard, a disk drive, a flash drive or another other storage device, a microphone, a speaker, headphones, a modem or other communication devices, and various other standalone components. For this purpose, some embodiments of the portable Braille device can include various I/O communication ports. These I/O ports may include a variety of communication standards or custom communication technologies, such as a serial port, a parallel port, a universal serial bus (USB), a high-definition multimedia interface (HDMI) port, a data transfer port, an audio port, a wireless port (e.g., a radio-frequency port, a Wi-Fi port, a Bluetooth™ port and an optical port) or, generally, any appropriate audio, video or data communication port.

In one embodiment, the refreshable Braille display device can include various other components. For example, in some embodiments, the refreshable Braille display device can include control buttons on the housing, a lighting module associated with a camera, and/or one or more sensors. Exemplary sensors can include, without being limited to, an accelerometer, a gyroscope, an electronic compass, a proximity sensor and a global positioning system (GPS) receiver.

The refreshable Braille display device can be a portable, single-unit refreshable Braille display device. As illustratively used herein, the term "portable" is intended to refer to an electronic Braille device that is both small and light enough to be readily carried by a user. However, although a portable refreshable Braille device can be used as a standalone unit, it may also be connected to and used in combination with stationary equipment. Accordingly, in some embodiments, the refreshable Braille device may be momentarily, or permanently, connected to one or more peripheral devices such as, for example, a personal computer, a tablet computer, a smartphone, a cellular phone, a keyboard, a monitor, a printer, an embosser, a hard or a flash drive, a camera, and the like.

As illustratively used herein, the term "single-unit" is intended to refer to the fact that the physical components of the Braille device are manufactured into an integral structure whose overall shape and dimensions generally match those of the housing. It will be understood that in some embodiments, the single-unit Braille device may include all the necessary hardware, software and processing capabilities to receive, process, store, retrieve, modify and display Braille content or data, as well as other types of information, as a standalone unit without requiring connection to another device. Alternatively, in other embodiments, the single-unit portable Braille device may act mostly as a Braille input/output (I/O) terminal, which is intended to be connected or coupled to at least one peripheral device to perform one or more functions.

Figure 5:
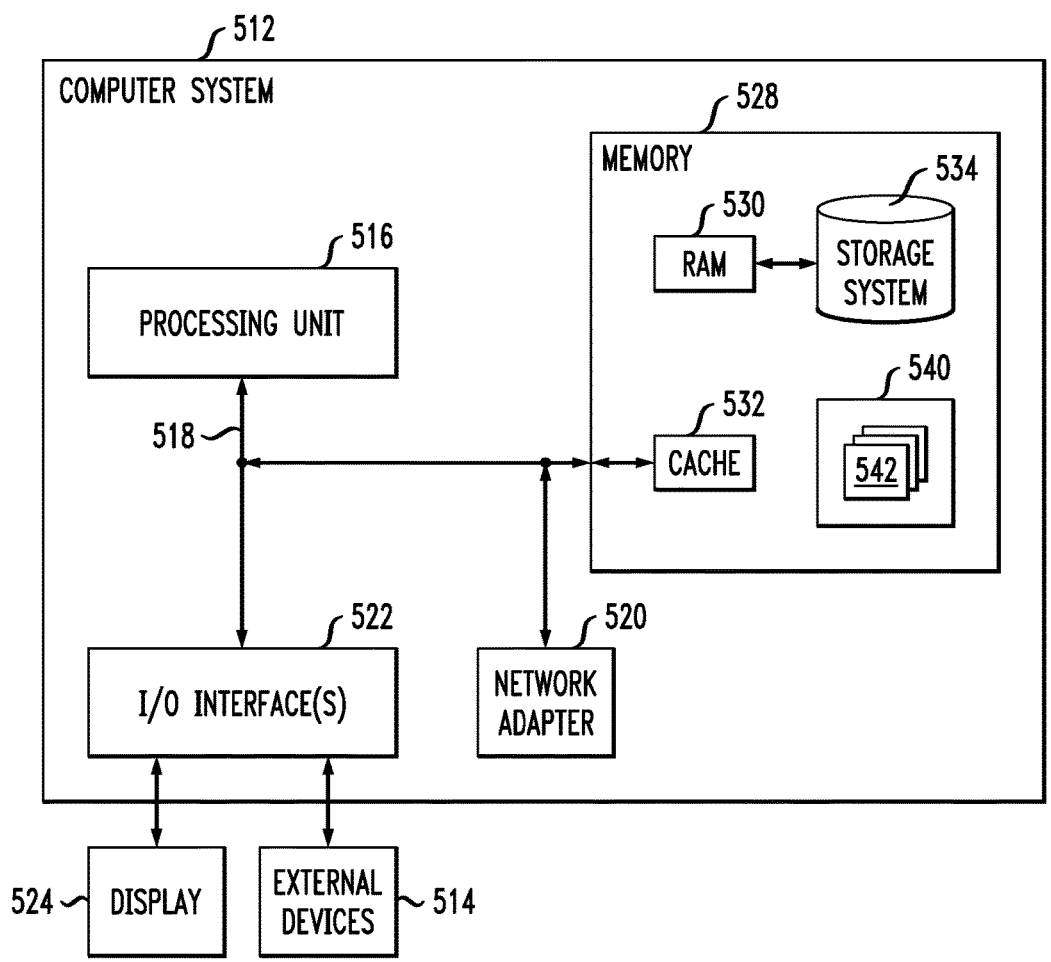
FIG. 5 depicts a computer system in accordance with which one or more components/steps of techniques of the invention may be implemented according to an embodiment of the invention.

One or more embodiments can make use of software running on a computer or workstation. With reference to FIG. 5, in a computing node 510 there is a system/server 512, which is operational with numerous other general purpose or special purpose computing system environments or configurations. Examples of well-known computing systems, environments, and/or configurations that may be suitable for use with system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

System/server 512 may be described in the general context of computer system executable instructions, such as program modules, being executed by a computer system. Generally, program modules may include routines, programs, objects, components, logic, data structures, and so on that perform particular tasks or implement particular abstract data types. System/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, system/server 512 is shown in the form of a computing device. The components of system/server 512 may include, but are not limited to, one or more processors or processing units 516, system memory 528, and bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 512 typically includes a variety of computer system readable media. Such media may be any available media that is accessible by system/server 512, and it includes both volatile and non-volatile media, removable and non-removable media.

The system memory 528 can include computer system readable media in the form of volatile memory, such as random access memory (RAM) 530 and/or cache memory 532. System/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces.

As depicted and described herein, memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

System/server 512 may also communicate with one or more external devices 514 such as a keyboard, a pointing device, an external data storage device (e.g., a USB drive), display 524, one or more devices that enable a user to interact with system/server 512, and/or any devices (e.g., network card, modem, etc.) that enable system/server 512 to communicate with one or more other computing devices. Such communication can occur via I/O interfaces 522. Still yet, system/server 512 can communicate with one or more networks such as a LAN, a general WAN, and/or a public network (e.g., the Internet) via network adapter 520. As depicted, network adapter 520 communicates with the other components of system/server 512 via bus 518. It should be understood that although not shown, other hardware and/or software components could be used in conjunction with system/server 512. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
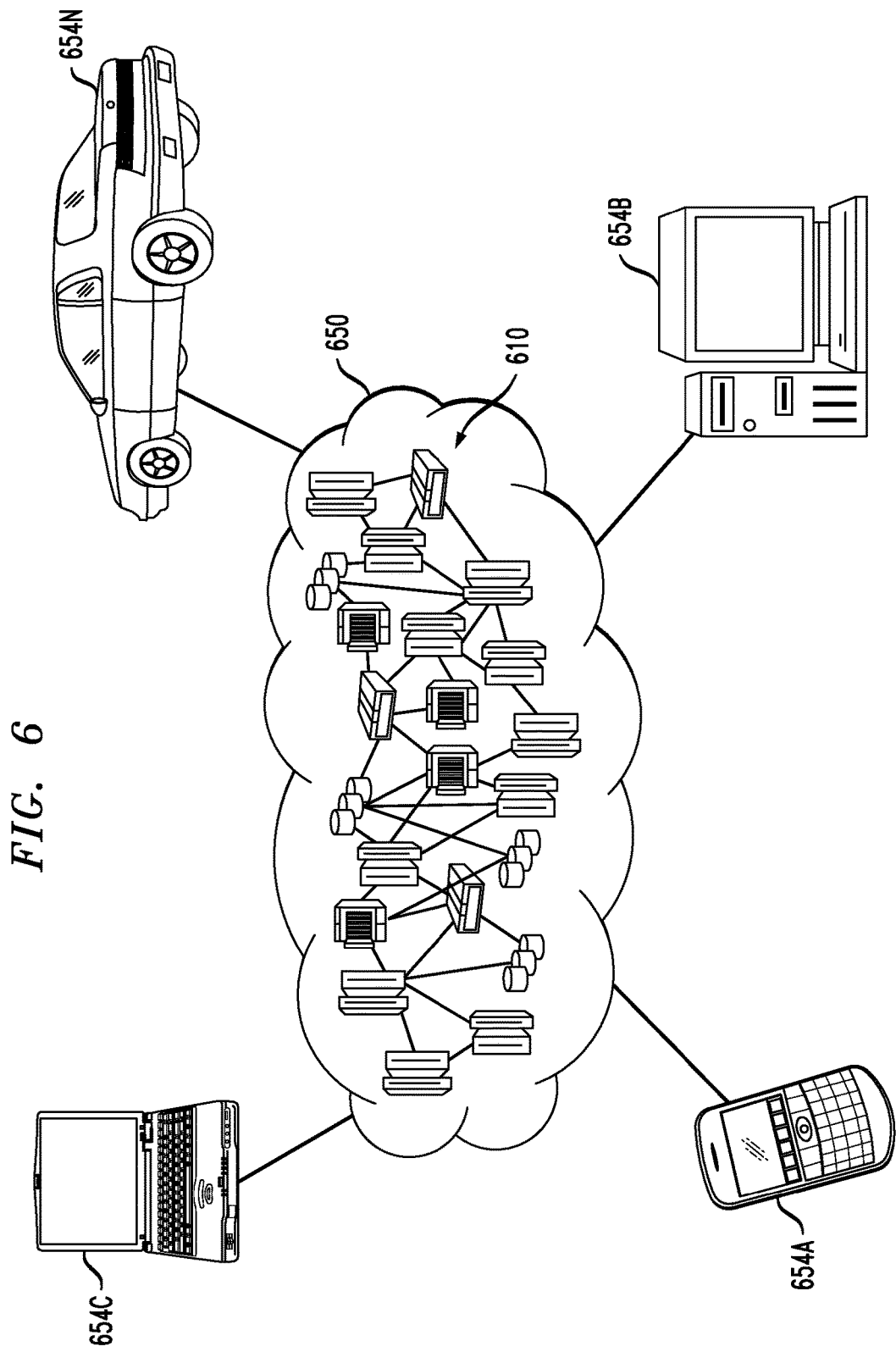
FIG. 6 depicts a cloud computing environment according to an embodiment of the invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
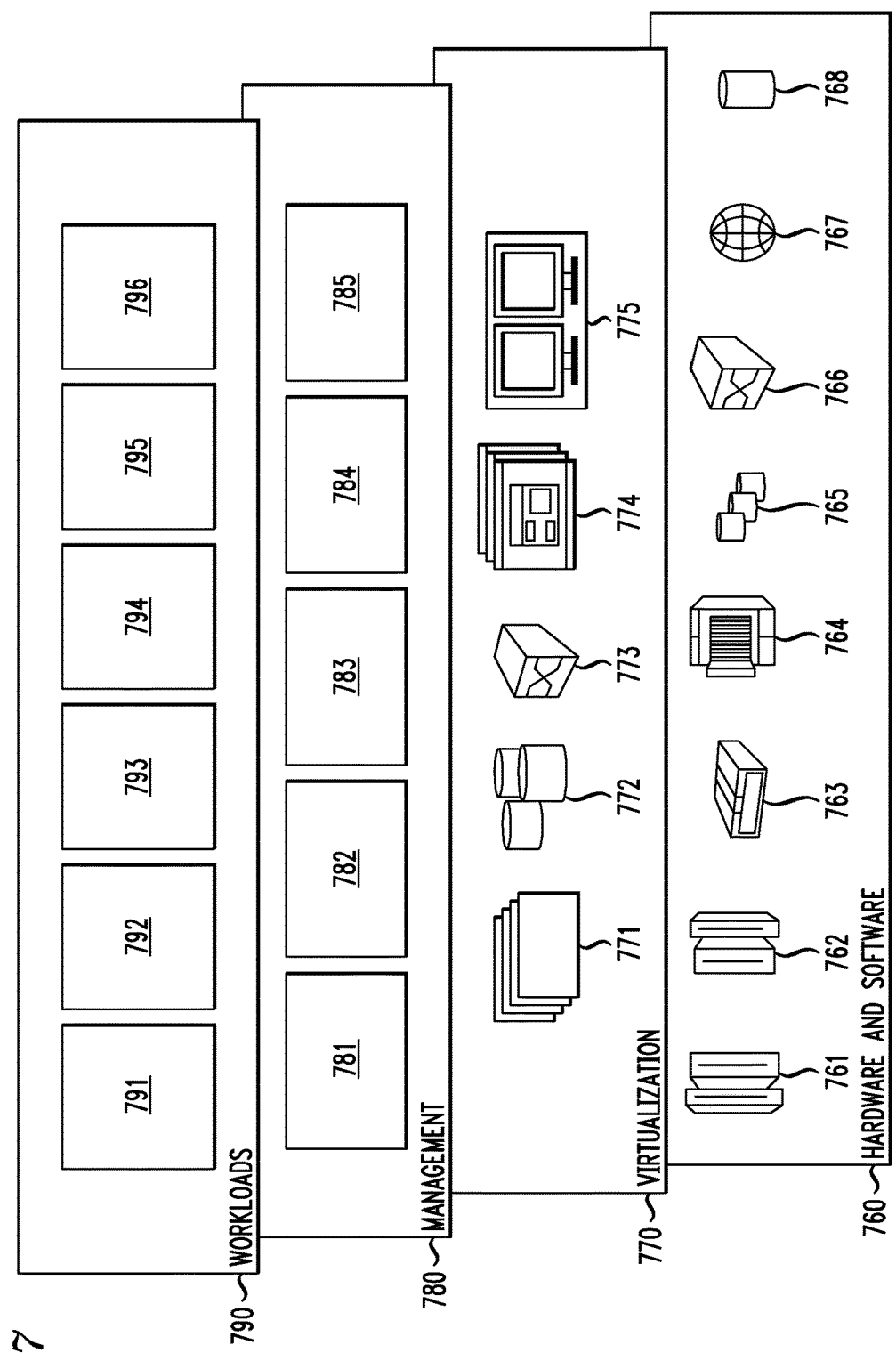
FIG. 7 depicts abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: transaction data capture 791; blockchain computation 792; data analytics processing 793; risk assessment 794; alert processing 795; and ameliorative/corrective/remedial action implementation 796, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in art without departing from the scope or spirit of the invention.

The invention claimed is:

1. A refreshable Braille display device comprising:
 (a) a housing comprising a surface containing a set of first tactile markers thereon;
 (b) a carriage in cooperation with the housing, the carriage having a surface containing a second tactile marker thereon and a series of individual refreshable Braille cells positioned above the second tactile marker for tactile reading by a user; and
 (c) a moving mechanism for moving the carriage relative to the housing such that the second tactile marker on the surface of the carriage is aligned with one of the first tactile markers in the set of first tactile markers on the surface of the housing;
 wherein the refreshable Braille display device is configured to receive a signal from at least one processor representing an instruction to the moving mechanism associated with positioning the second tactile marker on the surface of the carriage with one of the first tactile markers in the set of first tactile markers on the surface of the housing and wherein the signal initiates the moving mechanism to move the carriage relative to the housing such that the second tactile marker on the surface of the carriage is aligned with one of the first tactile markers in the set of tactile markers on the surface of the housing based on a level of indentation for the series of individual refreshable Braille cells.

2. The refreshable Braille display device of claim 1, wherein the set of first tactile markers are in parallel.

3. The refreshable Braille display device of claim 1, wherein the set of first tactile markers comprises from about 10 to about 80 tactile markers.

4. The refreshable Braille display device of claim 1, wherein the set of first tactile markers are in a raised position relative to the surface of the housing and the second tactile marker is in a raised position relative to the surface of the carriage.

5. The refreshable Braille display device of claim 1, wherein the series of individual refreshable Braille cells comprises a linear array of one or more rows of adjacent individual refreshable Braille cells, each Braille cell comprising a plurality of electromechanically controlled pins, each pin being selectively raisable and lowerable in response to electrical commands originating from a processing unit.

6. The refreshable Braille display device of claim 1, wherein the series of individual refreshable Braille cells comprises from about 10 to about 80 Braille cells.

7. The refreshable Braille display device of claim 1, wherein the series of individual refreshable Braille cells comprises from about 60 to about 80 Braille cells.

8. The refreshable Braille display device of claim 5, wherein the series of individual refreshable Braille cells comprises from about 10 to about 80 Braille cells.

9. The refreshable Braille display device of claim 1, wherein the moving mechanism comprises a motor and a gear.

10. The refreshable Braille display device of claim 9, wherein the motor is an electric motor and the gear is a worm gear.

11. The refreshable Braille display device of claim 1, which is in wired communication with a computer.

12. The refreshable Braille display device of claim 1, which is in wireless communication with a computer.

13. The refreshable Braille display device of claim 1, which is a portable refreshable Braille display device.

14. The refreshable Braille display device of claim 1, which is a portable single-unit refreshable Braille display device.

15. A method, comprising the step of:
operating a refreshable Braille display device comprising:
(a) a housing comprising a surface containing a set of first tactile markers thereon;
(b) a carriage in cooperation with the housing, the carriage having a surface containing a second tactile marker thereon and a series of individual refreshable Braille cells positioned above the second tactile marker for tactile reading by a user; and
(c) a moving mechanism for moving the carriage relative to the housing such that the second tactile marker on the surface of the carriage is aligned with one of the first tactile markers in the set of first tactile markers on the surface of the housing;
wherein the operating step is implemented via at least one processor operatively coupled to the refreshable Braille display device, and
wherein the operating step comprises receiving a signal from the at least one processor representing an instruction to the moving mechanism associated with positioning the second tactile marker on the surface of the carriage with one of the first tactile markers in the set of first tactile markers on the surface of the housing and wherein the signal initiates the moving mechanism to move the carriage relative to the housing such that the second tactile marker on the surface of the carriage is aligned with one of the first tactile markers in the set of tactile markers on the surface of the housing based on a level of indentation for the series of individual refreshable Braille cells.

16. The method of claim 15, wherein the series of individual refreshable Braille cells comprises a linear array of one or more rows of adjacent individual refreshable Braille cells, each Braille cell including a plurality of electromechanically controlled pins, each pin being selectively raisable and lowerable in response to the signal originating from the processing unit.

17. The method of claim 15, wherein the refreshable Braille display device is a portable refreshable Braille display device.

18. A computer program product comprising a processor-readable storage medium having encoded therein executable code of one or more software programs, wherein the one or more software programs when executed by the one or more processors implement step of:
sending a signal from the processor to a refreshable Braille display device comprising:
(a) a housing comprising a surface containing a set of first tactile markers thereon;
(b) a carriage in cooperation with the housing, the carriage having a surface containing a second tactile marker thereon and a series of individual refreshable Braille cells positioned above the second tactile marker for tactile reading by a user; and
(c) a moving mechanism for moving the carriage relative to the housing such that the second tactile marker on the surface of the carriage is aligned with one of the first tactile markers in the set of first tactile markers on the surface of the housing,
wherein the signal represents an instruction to the moving mechanism associated with positioning the second tactile marker on the surface of the carriage with one of the first tactile markers in the set of first tactile markers on the surface of the housing and wherein the signal initiates the moving mechanism to move the carriage relative to the housing such that the second tactile marker on the surface of the carriage is aligned with one of the first tactile markers in the set of tactile markers on the surface of the housing based on a level of indentation for the series of individual refreshable Braille cells.

19. The computer program product of claim 18, wherein the series of individual refreshable Braille cells comprises a linear array of one or more rows of adjacent individual refreshable Braille cells, each Braille cell including a plurality of electromechanically controlled pins, each pin being selectively raisable and lowerable in response to the signal originating from the processor.

20. The computer program product of claim 18, wherein the refreshable Braille display device is a portable refreshable Braille display device.

* * * * *